(12) United States Patent
Pirmann

(10) Patent No.: US 8,975,608 B2
(45) Date of Patent: Mar. 10, 2015

(54) APPARATUS AND SYSTEM FOR READING OUT X-RAY INFORMATION STORED IN STORAGE PHOSPHOR PLATES

(75) Inventor: Anton Pirmann, Munich (DE)

(73) Assignee: Agfa HealthCare NV, Mortsel (BE)

( * ) Notice: Subject to any disclaimer, the term of this patent is extended or adjusted under 35 U.S.C. 154(b) by 0 days.

(21) Appl. No.: 14/342,849

(22) PCT Filed: Aug. 13, 2012

(86) PCT No.: PCT/EP2012/003451
§ 371 (c)(1),
(2), (4) Date: Mar. 5, 2014

(87) PCT Pub. No.: WO2013/034240
PCT Pub. Date: Mar. 14, 2013

(65) Prior Publication Data
US 2014/0225011 A1    Aug. 14, 2014

(30) Foreign Application Priority Data
Sep. 6, 2011    (EP) .................................... 11007231

(51) Int. Cl.
*G01T 1/105*    (2006.01)
*G01T 1/20*    (2006.01)
*G03B 42/02*    (2006.01)
*G03B 42/04*    (2006.01)

(52) U.S. Cl.
CPC ............ *G01T 1/2014* (2013.01); *G03B 42/025* (2013.01); *G03B 42/045* (2013.01)
USPC ....................................................... 250/585

(58) Field of Classification Search
USPC ..................... 250/362, 585; 206/455; 378/181
See application file for complete search history.

(56) References Cited

U.S. PATENT DOCUMENTS

| | | | |
|---|---|---|---|
| 2,880,846 A | | 4/1959 | Schone |
| 3,409,149 A | | 11/1968 | Graux |
| 4,068,622 A | * | 1/1978 | Vola .............................. 399/277 |
| 4,582,989 A | * | 4/1986 | Agano .......................... 250/585 |
| 4,973,134 A | * | 11/1990 | Finkenzeller et al. ........ 250/584 |
| 5,210,416 A | | 5/1993 | Seto et al. |

(Continued)

FOREIGN PATENT DOCUMENTS

| | | |
|---|---|---|
| EP | 1 209 517 A2 | 5/2002 |
| JP | 10-3000 A | 1/1998 |

OTHER PUBLICATIONS

Official Communication issued in International Patent Application No. PCT/EP2012/003451, mailed on Oct. 5, 2012.

(Continued)

*Primary Examiner* — David J Makiya
*Assistant Examiner* — Taeho Jo
(74) *Attorney, Agent, or Firm* — Keating & Bennett, LLP

(57) ABSTRACT

An apparatus and a corresponding system for reading out X-ray information stored in a storage phosphor plate includes a reading device for irradiating the storage phosphor plate with stimulation light and for detecting emitted light excited thereby in the storage phosphor plate, and a transport device for transporting the storage phosphor plate relative to the reading device and having a roller drive and at least one roller that can be set rotating about the axis of rotation thereof by the roller drive. In order to simplify the design of the apparatus and of the system while providing as reliable a transport of the storage phosphor plate as possible, the roller includes at least one magnetic area that has a helical progression.

14 Claims, 2 Drawing Sheets

(56) References Cited

U.S. PATENT DOCUMENTS

| | | | |
|---|---|---|---|
| 5,475,406 A * | 12/1995 | Takahashi | 347/154 |
| 6,068,439 A | 5/2000 | Ohta | |
| 2001/0052580 A1* | 12/2001 | Akimoto | 250/493.1 |
| 2002/0060303 A1* | 5/2002 | Yonekawa | 250/589 |
| 2006/0091336 A1* | 5/2006 | Muller et al. | 250/584 |
| 2011/0198254 A1* | 8/2011 | Pirmann | 206/455 |

OTHER PUBLICATIONS

English translation of Official Communication issued in corresponding International Application PCT/EP2012/003451, mailed on Mar. 20, 2014.

* cited by examiner

APPARATUS AND SYSTEM FOR READING OUT X-RAY INFORMATION STORED IN STORAGE PHOSPHOR PLATES

CROSS-REFERENCE TO RELATED APPLICATIONS

This application is a 371 National Stage Application of PCT/EP2012/003451, filed Aug. 13, 2012. This application claims the benefit of European Application No. 11007231.1, filed Sep. 6, 2011, which is incorporated by reference herein in its entirety.

BACKGROUND OF THE INVENTION

1. Field of the Invention

The present invention relates to an apparatus and a system for reading out X-ray information stored in storage phosphor plates.

2. Description of the Related Art

The storing of X-rays penetrating an object, for example a patient, as a latent image in a so-called storage phosphor plate constitutes an option for recording X-ray images. In order to read out the latent image, the storage phosphor plate is irradiated with stimulating light and thereby stimulated to emit emission light. The emission light, the intensity of which corresponds to the image stored in the storage phosphor plate, is detected by an optical detector and converted into electrical signals. The electrical signals are further processed, as required, and finally made available for analysis, in particular for medical-diagnostic purposes, by transmission to a corresponding output device, such as for example a monitor and/or a printer.

In prior art apparatuses and systems, storage phosphor plates are mostly transported relative to the read-out device by pairs of rotating rollers.

SUMMARY OF THE INVENTION

The problem addressed by preferred embodiments of the present invention is to provide an apparatus as well as a system for reading out X-ray information stored in storage phosphor plates that assure a transport of the storage phosphor plate that is as reliable as possible, while providing a straightforward structure.

Preferred embodiments of the present invention provide an apparatus and a system as described below.

The apparatus according to a preferred embodiment of the present invention comprises a read-out device for irradiating the storage phosphor plate with stimulating light and for detecting emission light which is thereby stimulated in the storage phosphor plate as well as a transport device for transporting the storage phosphor plate relative to the read-out device, in particular past the read-out device, comprising a roller drive and at least one roller that can be put into rotation about its rotational axis by the roller drive and is characterized in that the roller comprises at least one magnetic area following a helical course.

The system according to a preferred embodiment of the present invention comprises the apparatus according to a preferred embodiment of the present invention and a storage phosphor plate comprising a base layer and a storage phosphor layer coated onto the base layer, at least one partial area of the base layer being ferromagnetic.

Preferred embodiments of the invention are based on the thought of transporting the storage phosphor plate in the apparatus and the system, respectively, by one single roller having a magnetic area, whereby the magnetic area provided on the roller follows a helical course. In the context of the present invention, the term "helical course" is understood to be a course of the magnetic area in the form of a helical line, helix, coil or a so-called cylindrical spiral about the rotational axis of the roller, the distance from the magnetic area to the rotational axis being preferably constant, i.e. the helical course being circular in cross-section. Alternatively, however, it is also possible that the distance from the magnetic area to the rotational axis in the helical course is not constant and therefore deviates from a circular cross-section. For example, an elliptical cross-section would result in a flattened helical form of the magnetic area. In this case, the term "magnetic area" is understood to be an area of the roller which attracts ferromagnetic and/or paramagnetic bodies by magnetic forces.

A storage phosphor plate which is designed correspondingly—for example comprising a ferromagnetic base layer—is attracted by the magnetic areas of the roller so that the frictional forces which occur when the storage phosphor plate comes into contact with the roller—for example compared to a supporting action which is solely generated by gravity—are significantly increased. Thanks to this, a rotation of the roller provided with the magnetic area allows to achieve a reliable transport of the storage phosphor plate without requiring an additional roller for exerting pressure force onto the rotating roller. As a result, the structure of the apparatus and system, respectively, is substantially simplified, while simultaneously assuring a high reliability of the transport of the storage phosphor plate.

The helically configured course of the magnetic area moreover offers the advantage, compared to completely sheathing the roller with a magnetic layer, that during a complete rotation of the roller no abutting edges or overlapping, respectively, of the leading and trailing edge of the sheathing occur, thus ensuring a highly reliable, shock-free transport. The absence of abutting edges or overlapping edges moreover allows preventing jumps in the magnetic field lines generated by the magnetic area during the rotation of the roller, which additionally contributes to a shock-free transport of the storage phosphor plate. As the magnetic area does not have to be cut edge-to-edge within narrow tolerances during the manufacturing of the roller—such as, for example, in case of a complete sheathing with a magnetic layer—the production of the roller is moreover significantly simplified.

Preferably, the magnetic area follows a helical course about the rotational axis of the roller. As a result, the distance between the magnetic area and the storage phosphor plate being transported always remains constant during a rotation of the roller so that the attraction forces occurring during the rotation of the roller remain substantially unchanged, thus ensuring a transport which is particularly reliable and shock-free.

Moreover, it is preferred that the magnetic area has the form of a helically extending magnetic strip. Thanks to the strip-like design of the magnetic area, this can be realized in a simple way, for example by cutting out the magnetic strip from a magnetic foil and subsequently applying it to the roller. In case of a ferromagnetic roller, the magnetic attraction forces will keep the magnetic strip—which is helically wound around the roller—adhered to the roller. Additionally or in case the roller is not ferromagnetic, the magnetic strip can be fixed to the roller, for example, by using an adhesive. The strip-like design of the magnetic area allows achieving high attraction forces and hence high frictional forces between the storage phosphor plate and the roller, which in turn further enhances the reliability of the transport of the storage phosphor plate.

In a further preferred embodiment, provision is made that the magnetic field lines of the helically extending magnetic strip run substantially parallel to the rotational axis of the roller. On the one hand, this allows to achieve high magnetic attraction forces between the storage phosphor plate and the roller and, on the other hand, to prevent or at least strongly reduce interruptions or jumps of the magnetic field lines during a rotation of the roller.

Alternatively, however, it is also possible that the magnetic field lines of the helically extending magnetic strip run substantially parallel to its helical course. In this case, the magnetic field lines form an angle to the rotational axis of the roller which corresponds to the gradient of the helical course of the strip about the rotational axis. This embodiment offers the advantage of minimizing the cutting scraps when cutting out the strip from a magnetic foil, the magnetic field lines of which generally run parallel or perpendicular, respectively, to the lateral edges of the foil.

Preferably, the magnetic area is permanently magnetic. In this case, the magnetic area can be realized in a particularly simple way, for example, by applying a strip cut from a foil composed of permanently magnetic material on the roller. As a result, the magnetic attraction force exerted by the magnetic area is permanently present and does not need to be activated each time it is required.

In an alternative embodiment, the magnetic area is formed as an electromagnet. An electromagnet can be realized, for example, by using one or more coils, preferably having an iron core. The coil according to the present invention is helically arranged within or on the roller. This embodiment offers the advantage that the magnetic attraction force between the magnetic area and the storage phosphor plate can be switched off, as and when required, thus enabling an easier separation of the storage phosphor plate from the roller. This can be advantageous, for example, in case of maintenance operations or when clearing a possible jam of image plates.

In a further preferred embodiment of the present invention, the roller comprises an in particular cylindrical roller body in the circumferential area of which the helically extending magnetic area is provided. In particular, the helically extending magnetic area has been provided on the outer circumferential surface of the roller body. These measures allow an easy manufacturing of the roller according to preferred embodiments of the present invention, ensuring at the same time that the magnetic attraction forces between the roller and the storage phosphor plate during the rotation of the roller are not subjected to substantial variations, thus allowing a shock-free plate transport.

The roller body is preferably ferromagnetic. If the magnetic area is arranged on the outer circumferential area or in the inner circumferential area of the roller body, magnetic attraction forces are by themselves already sufficient to keep the roller body adhered to the circumferential area so that no additional fixing device, for example rivets, screws or adhesive, are needed. However, an additional fixation of the magnetic area to the circumferential area of the roller can be advantageous in order to ensure a particularly secure fixation. Preferably, the magnetic area is hereby attached to the circumferential area of the roller body by using an adhesive.

Preferably, the roller body is made of a ferritic steel. As ferritic steel, preference is hereby given to a ferromagnetic steel alloy having in particular a high corrosion resistance.

Moreover, it is preferred that the read-out device comprises a light source for irradiating the storage phosphor plate with stimulating light and a detector for detecting emission light which is thereby stimulated in the storage phosphor plate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
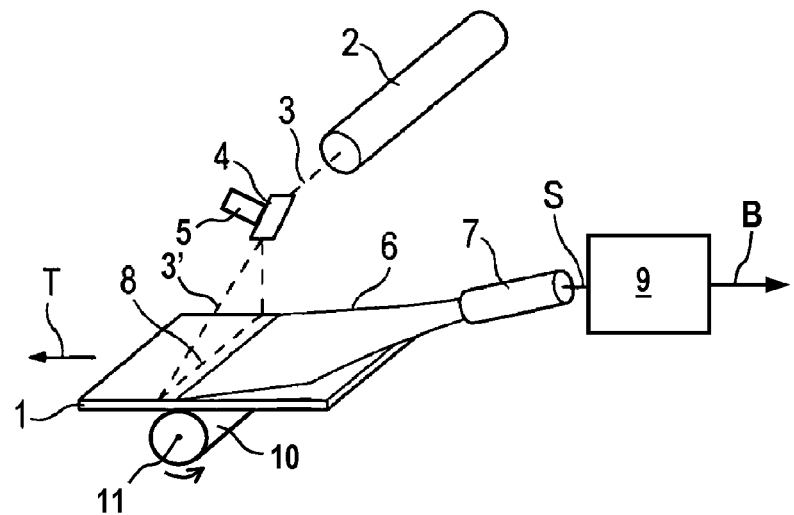
FIG. 1 a schematic representation of an example of an apparatus for reading out storage phosphor plates.

FIG. 1 shows a read-out device for reading out a storage phosphor plate 1. A laser 2 generates a stimulating light beam 3 that is deflected by a deflection element 4 in such a way that the stimulating light beam moves along a line 8 across the storage phosphor plate 1 to be read out. The deflection element 4 has a reflecting area, in particular in the form of a mirror, that is made to move oscillatingly by a drive device 5. Alternatively, the deflection element 4 can have a polygon mirror that is made to move rotatively by the drive device 5, in this case a motor, and deflects the stimulating light beam 3 across the storage phosphor plate 1.

During the movement of the deflected stimulating light beam 3' across the storage phosphor plate 1, this storage phosphor plate emits emission light depending on the X-ray information stored therein, which emission light is collected by an optical collection device 6, for example an optical fiber bundle or a suitable mirror device, and detected by an optical detector 7, preferably a photomultiplier (PMT), and is thereby converted into a corresponding detector signal S.

The detector signal S is transmitted to a processing device 9, in which digital image signal values B for individual pixels of the read out X-ray image are derived.

The transport of the storage phosphor plate 1 in the transport direction T by a transport device has the effect that individual lines 8 of the storage phosphor plate 1 are successively read out, and a two-dimensional composite X-ray image is thereby obtained that is composed of individual pixels with respectively one associated image signal value B.

In the example shown, the transport device comprises a roller 10 which is put into rotation about the rotational axis 11 by a roller drive (not shown). The storage phosphor plate 1 is supported on its underside by the roller 10 and is conveyed by a rotation of the roller 10 in the direction T as a result of the frictional engagement that arises hereby. The roller 10 has magnetic, preferably permanently magnetic or electromagnetic, areas that interact with ferromagnetic areas that are provided in the storage phosphor plate 1 so that the storage phosphor plate 1 is attracted by the roller 10, which significantly reinforces the frictional engagement. This will be illustrated hereinafter in greater detail with reference to further figures.

Figure 2:
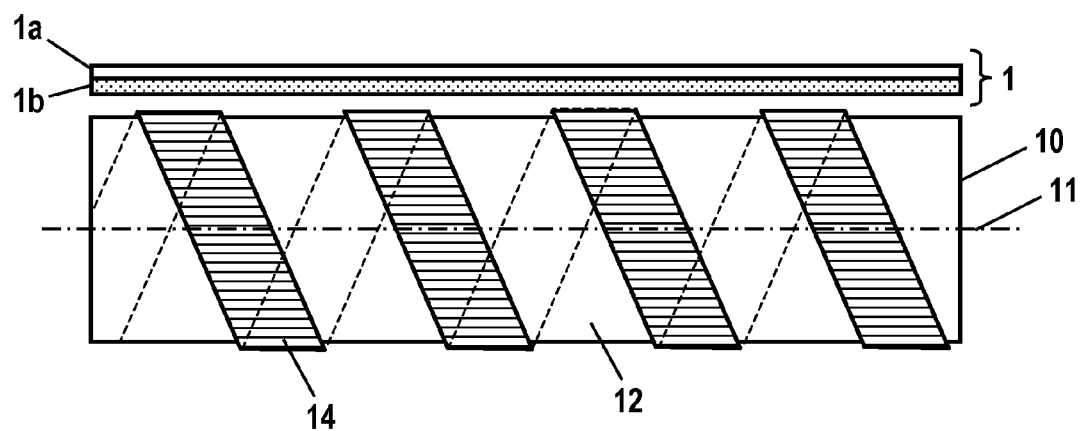
FIG. 2 a first example of a roller, together with an example of a storage phosphor layer.

FIG. 2 shows a side view of a first example of the roller 10. The roller 10 preferably has the form of a plain cylinder composed of a ferromagnetic material. Alternatively, however, the roller can also be formed as an elongated hollow cylinder. Instead of using a ferromagnetic material, the roller 10 can also be made of a paramagnetic material, such as, for example, aluminum.

The outer circumferential area 12 of the roller 10 is provided with a strip-like area 14 containing a permanently magnetic material and being helically wound around the outer circumferential area 12 of the roller 10. The permanently magnetic material contained in the strip-like area 14 generates magnetic field lines that are schematically indicated by horizontal lines in the strip-like area 14. Preferably, the magnetic material in the strip-like area 14 is oriented and/or the gradient of the helical course of the strip-like area 14 is selected so that the magnetic field lines run substantially parallel to the rotational axis 11 of the roller 10.

FIG. 2 further shows a cross-sectional view of a storage phosphor plate 1. A storage phosphor layer 1a in the form of storage phosphor particles contained in a supporting matrix (so-called Powder Image Plate, PIP) or in the form of needle-shaped storage phosphor structures (so-called Needle Image Plate, NIP) is applied to a base layer 1b which is ferromagnetic at least in a partial area. This can preferably be realized by coating the base layer 1b with a plastic layer in which ferromagnetic particles, for example iron particles, are embedded. Alternatively or additionally, however, it is also possible that at least a partial surface of the base layer 1b comprises a ferromagnetic material, for example in the form of a steel sheet, which is optionally provided with a plastic layer on the side facing the storage phosphor layer 1a and/or on the side opposite to the storage phosphor layer 1a.

When the base layer 1b of the storage phosphor plate 1 comes into contact with the strip-like magnetic area 14 of the roller 10, the frictional forces that hereby occur are significantly increased as a result of the magnetic forces acting between the strip-like area 14 and the base layer 1b so that a rotation of the roller 10—as shown in FIG. 1—is by itself sufficient to reliably transport the storage phosphor plate 1, without an additional counter-roller having to be arranged over the roller 10.

The helical course of the strip-like area 14 offers the advantage, compared to simply sheathing the roller 10 with a magnetic layer, that during a rotation of the roller 10 by 360° no abutting edges or overlapping ends, respectively, of the sheathing occur, thus ensuring a shock-free transport of the storage phosphor plate 1.

This is also advantageous from a manufacturing point of view in that a precise edge-to-edge cutting of the magnetic layer—such as is required in case of a simple sheathing—can be omitted thanks to the helical course of the area 14. Not least, the helical course of the strip-like area 14 offers the advantage that, thanks to the absence of abutting or overlapping at the ends of the sheathing, even a 360° rotation will not cause abrupt jumps in the magnetic field lines, which additionally enhances the shock-free nature of the transport of the storage phosphor plate.

Figure 3:
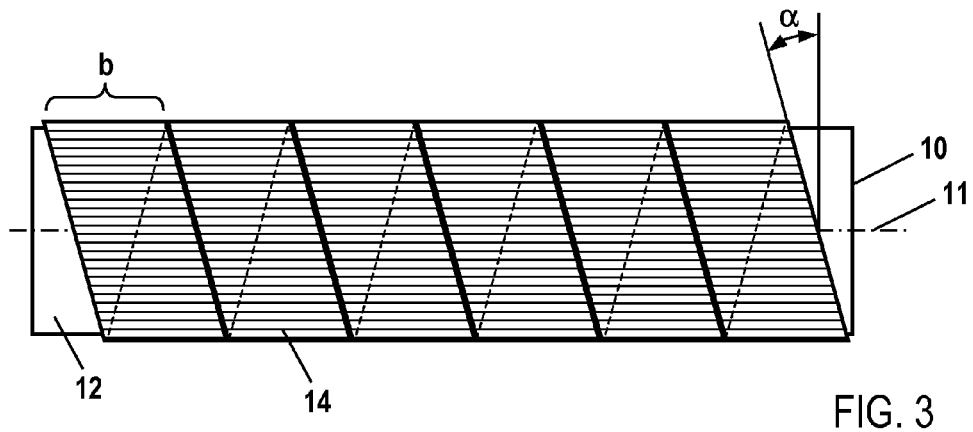
FIG. 3 a second example of a roller.

FIG. 3 shows a second example of a roller 10 represented in a side view. Contrary to the roller shown in FIG. 2, the width b of the strip-like area 14 and the gradient angle α of the helical course of the strip-like area 14 are selected so that any gaps between the individual loops of the strip-like area 14 are substantially excluded so that the substantial part of the outer circumferential area 12 of the roller 10 is covered by the helically extending strip-like area 14.

In this embodiment, particularly high magnetic attraction forces between the ferromagnetic base layer 1b of the storage phosphor plate 1 and the roller 10 are achieved. Moreover, the absence of any gaps between the individual gradient sections of the strip-like area 14 allows to achieve a particularly smooth transport of the storage phosphor plate 1. Moreover, the statements in connection with the example shown in FIG. 2 apply correspondingly.

Figure 4:
FIG. 4 an example of a cross-sectional view through a magnetic foil.

FIG. 4 shows an example of a cross-sectional view through a magnetic foil by which the strip-like area 14 (see FIGS. 2 and 3) can be realized. The magnetic foil comprises a paramagnetic layer 14a whose bottom side is provided with an adhesive layer 14b that allows adhesively bonding it to the outer circumferential area 12 of the roller 10. As stated hereinbefore, the roller 10 can be formed ferromagnetically at least in its outer circumferential area 12 so that the permanently magnetic layer 14a is additionally kept adhered to the roller 10 by magnetic attraction forces. However, in case of a ferromagnetic circumferential area 12 of the roller 10, the additional adhesive layer 14b can also be omitted inasmuch as the magnetic attraction forces between the permanently magnetic layer 14a and the roller 10 are sufficiently strong.

Figure 5:
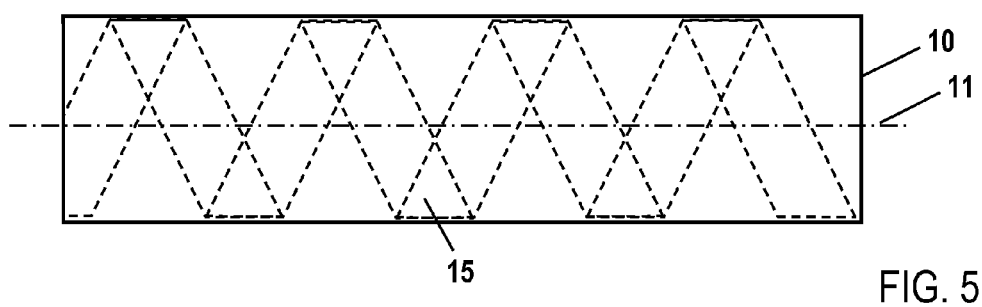
FIG. 5 a third example of a roller.

FIG. 5 shows a third example of a roller 10 whose interior is provided with a helically extending area 15 made of permanently magnetic material. This can be realized, for example, by forming the roller 10 as a cylindrical hollow body whose cylindrical inner wall is provided with the strip-like area 15, for example by adhesively bonding and/or by magnetic attraction forces, in case the roller 10 having the form of a hollow cylinder is ferromagnetic.

Apart from the advantages already illustrated in the context of FIGS. 2 and 3, this embodiment offers the particular advantage that, on the one hand, the frictional forces occurring when the base layer 1b comes into contact with the storage phosphor plate 1 and the outer circumferential area 12 of the roller 10 are sufficiently large—because of the magnetic attraction forces—to ensure a reliable transport of the storage phosphor plate 1, and, on the other hand, any wear of the base layer 1b caused by a direct contact with the roller 10 can be reduced.

Figure 6:
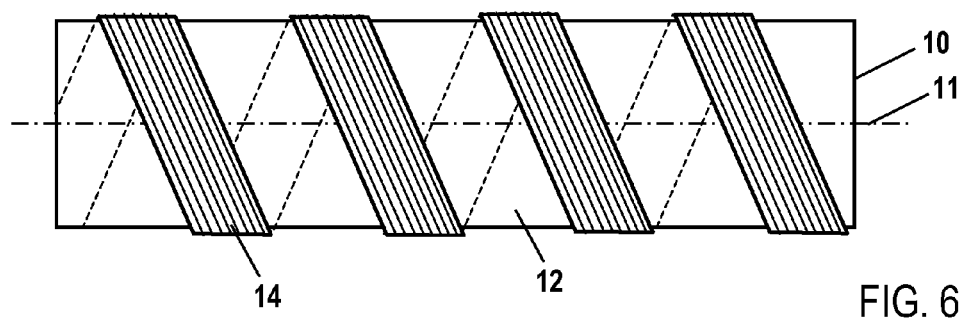
FIG. 6 a fourth example of a roller.

FIG. 6 shows a fourth example of a roller 10 whose circumferential area 12 is provided with a helically extending area 14 made of permanently magnetic material. Contrary to the example shown in FIG. 2, the magnetic field lines of the strip-like area 14 do not run parallel to the rotational axis 11 of the roller 10, but substantially along the helical course, i.e. parallel to the gradient of the helical course. The magnetic field lines hereby form an angle to the rotational axis 11 of the roller 10 that corresponds to the gradient of the helical course of the strip 14 about the rotational axis 11. This implementation offers the advantage, compared to the example shown in FIG. 2, of minimizing the cutting scraps when cutting out the strip 14 from a magnetic foil, the magnetic field lines of which generally run parallel or perpendicular, respectively, to the lateral edges of the foil. Moreover, at not too small gradient angles, in particular more than 15°, in particular more than 22°, this variant too allows to achieve relatively high magnetic attraction forces between the storage phosphor plate 1 and the roller 10 and to simultaneously minimize interruptions or jumps of the magnetic field lines during a rotation of the roller 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. An apparatus for reading out X-ray information stored in a storage phosphor plate, the apparatus comprising:

a read-out device configured to irradiate the storage phosphor plate with stimulating light and to detect emission light which is stimulated in the storage phosphor plate;
a transport device configured to transport the storage phosphor plate relative to the read-out device, the transport device including a roller drive and at least one roller configured to rotate about a rotational axis of the at least one roller by the roller drive; wherein
the at least one roller includes a magnetic area arranged along a helical course.

2. The apparatus according to claim 1, wherein the helical course is arranged about or along the rotational axis of the at least one roller.

3. The apparatus according to claim 1, wherein the magnetic area is a helically extending magnetic strip.

4. The apparatus according to claim 3, wherein magnetic field lines of the magnetic strip extend parallel or substantially parallel to the rotational axis of the at least one roller.

5. The apparatus according to claim 3, wherein magnetic field lines of the magnetic strip extend parallel or substantially parallel to the helical course of the magnetic area.

6. The apparatus according to claim 1, wherein the magnetic area includes a permanent magnet.

7. The apparatus according to claim 1, wherein the magnetic area includes an electromagnet.

8. The apparatus according to claim 1, wherein the at least one roller includes a cylindrical roller body, and the magnetic area is provided in a circumferential area of the cylindrical roller body.

9. The apparatus according to claim 8, wherein the magnetic area is provided on an outer circumferential surface of the cylindrical roller body.

10. The apparatus according to claim 8, wherein the cylindrical roller body is ferromagnetic.

11. The apparatus according to claim 10, wherein the cylindrical roller body includes ferritic steel.

12. The apparatus according to claim 1, wherein the read-out device includes a light source configured to irradiate the storage phosphor plate with stimulating light, and a detector configured to detect emission light which is stimulated in the storage phosphor plate.

13. A system for reading out X-ray information stored in a storage phosphor plate, the system comprising:
a storage phosphor plate including a base layer and a storage phosphor layer on the base layer, at least a partial area of the base layer being ferromagnetic; and
an apparatus according to claim 1.

14. The system according to claim 13, wherein the base layer includes ferritic steel.

* * * * *